Feb. 9, 1960 J. W. STUDEBAKER ET AL 2,924,024
EDUCATIONAL WORKBOOK
Original Filed June 28, 1954
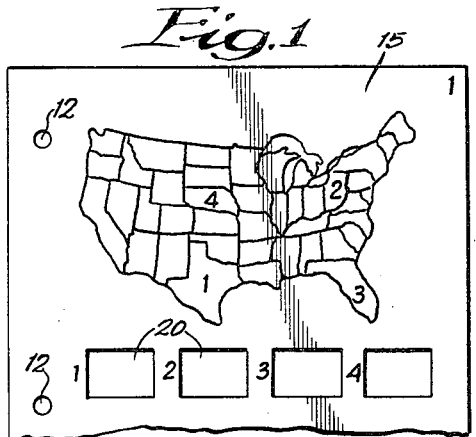
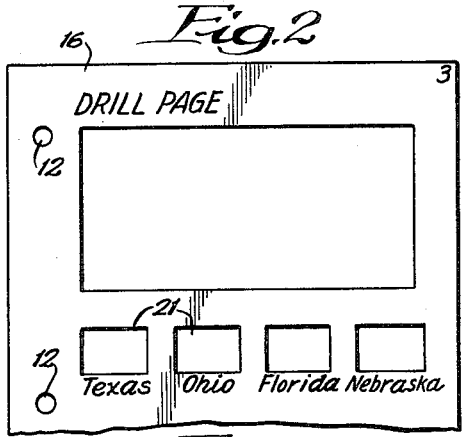
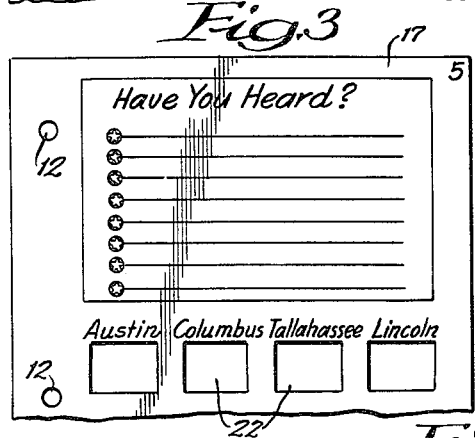
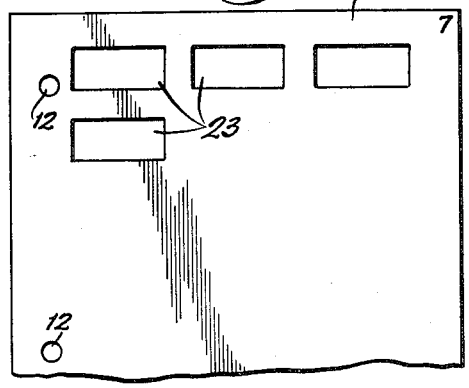
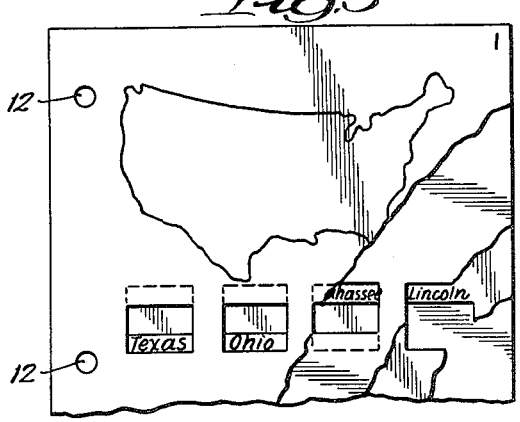
INVENTORS:
John W. Studebaker
and John G. Studebaker,
BY Bair, Freeman & Molinare
ATTORNEYS.

United States Patent Office 2,924,024
Patented Feb. 9, 1960

2,924,024

EDUCATIONAL WORKBOOK

John W. Studebaker and John G. Studebaker,
Bronxville, N.Y.

Original application June 28, 1954, Serial No. 439,742, now Patent No. 2,789,370, dated April 23, 1957. Divided and this application October 15, 1956, Serial No. 615,898

1 Claim. (Cl. 35—9)

This is a divisional application of our earlier copending application Serial No. 439,742, filed June 28, 1954, also entitled "Educational Workbook, now Patent No. 2,789,370, dated April 23, 1957.

The invention relates to an educational workbook having perforated or apertured leaves containing incomplete subject matter (questions) associated with the apertures on one side of the leaf and completing subject matter (answers) visible through the apertures from the sheet beneath. More particularly, the invention relates to a workbook of the nature indicated having a unique arrangement and interrelationship of leaves and pages and of the mechanical structure and typography of leaves and pages, whereby the learner may study the exercises, test himself on his achievement by writing in responses to the incomplete subject matter through the apertures on a separate blank sheet of paper inserted beneath the apertured sheet, and then check the accuracy of his responses by properly aligning the responses on the separate sheet beneath the apertures adjacent to which the correct completed subject matter is printed.

One object of the invention is to provide a workbook of the type described in which the apertured leaves are underlaid with a solid unapertured leaf, or unapertured portion of a leaf, capable of bridging the apertures in the underlying leaves to provide a smooth supporting surface for a separate sheet of paper upon which responses are to be written.

Another object is to provide such a workbook wherein each aperture in one leaf overlaps a corresponding aperture in an adjacent leaf so that the margin adjoining the aperture in the underlying leaf is visible through the aperture in the top leaf. With this arrangement incomplete subject matter in the form of questions is carried by the top leaf, one question for each aperture. The completing subject matter or answers are carried on the exposed aperture margins of the underlying leaf. Thus, the learner can study the questions and the answers prior to testing himself since both are completely visible. When ready for testing, the learner places a blank sheet of paper beneath the top leaf, thus obscuring the answers appearing on the exposed margins of the underlying leaf. He then writes his answers to the questions through the apertures onto the blank sheet. The leaves in the book are so arranged that a smooth supporting writing surface is provided for the worksheet. This supporting writing surface is provided by an underlying unapertured leaf, or an unapertured portion of a leaf, which bridges over the apertures in the leaves beneath.

The invention is set forth more particularly in the appended claim and in the following detailed description illustrated by the accompanying drawings, in which:

Figure 1 is a plan view of the top apertured leaf of one set of leaves comprising a book constructed in accordance with this invention. The lower portion of the leaf is broken away;

Figure 2 is a similar view of the second leaf of the set;

Figure 3 is a similar view of the third leaf which is identical to the first leaf in construction, only the written material being different;

Figure 4 is a plan view of the leaf which provides the smooth supporting writing surface for a worksheet inserted beneath any one of the first three leaves; and Figure 5 is a plan view of the leaves in assembled relation with the top leaves being broken away so as to expose the underlying leaves.

In the particular form shown the invention is used for the instruction of a learner in the field of geography, although it is apparent that the invention may be used for instruction in other subjects. Leaves 15, 16 and 17 have a series of apertures through the lower portion thereof while leaf 18 is solid in the area where leaves 15, 16 and 17 are apertured, and is adapted to bridge over the apertures in the underlying leaves. The four leaves shown comprise a single set. Sets may consist of two or more leaves. The leaves are bound along the left-hand edge as in any conventional book. In the particular form shown, the leaves are adapted to be incorporated in a looseleaf binder by means of the holes 12. The aligned apertures 20 in the leaf 15 are of the same size as the apertures 21 in the leaf 16, but are disposed slightly lower on the leaf. It will be noted that by this overlapping arrangement, the lower margin adjoining the apertures 21 is exposed through the apertures 20, as best shown in Figure 5. The apertures 22 in leaf 17 are staggered or overlap with respect to the apertures 21 in leaf 16. In the form shown, apertures 22 correspond exactly in size and location to the apertures 20 in leaf 15. With the apertures 21 moved upwardly with respect to the apertures 22 we find that the margin adjoining the upper edge of apertures 22 becomes visible through apertures 21. All of the apertures are of the same width and from Figure 5 it will be apparent that a central opening is provided through the superimposed apertures 20, 21 and 22. It will be apparent that although only one row of apertures is shown in each sheet, as many rows as desired may be employed, disposed beneath the row shown.

In the exercise illustrated on page 1 of leaf 15 a map of the United States is printed showing the outlines of the individual states. Numbers are provided for certain of the states which are to be identified by the learner. The correct answer is printed adjacent the lower marginal edge of the aperture 21 on page 3 of leaf 16. Because the correct response is visible due to the overlapping relationship of the apertures, the learner is able to study both the incomplete and the completing subject matter before testing himself. For example, it will be noted that the State of Texas on the map on page 1 is identified by the numeral "1." This corresponds to the first aperture in the first row, which is also identified by the numeral "1." The correct response is visible through that aperture since it is printed on the exposed margin of the cooperating aperture 21 beneath.

After studying the outlines of each of the states and checking their names against the correct response which is visible through the numbered aperture on page 1, the learner may test himself by inserting a separate worksheet beneath leaf 15. This sheet obscures the answers "Texas," "Ohio," etc. The learner then writes his answers through the apertures 20 opposite the numbers corresponding to the states shown on the map. To check the accuracy of his answers the worksheet is removed and inserted beneath the leaf 16. Thus, the incomplete subject matter on page 1, the correct completing subject matter printed on page 3, and the learner's responses on the worksheet beneath page 3 are all visible simultaneously for self-checking.

The leaf 18, which is not apertured in the area underlying the apertures 20, 21, 22 serves as a smooth supporting writing surface for the worksheet by bridging over similar apertures (not shown) in leaves within the book beneath the particular set illustrated in the drawing. Leaf 18 may be unapertured or it may have apertures 23 in the upper portion with written matter printed in the lower portion.

From the foregoing description it will be apparent that leaves 15 and 16 cooperate to form a complete instructional set. If desired, however, a third leaf, identified by the numeral 17, may carry material cooperating with the subject matter on pages 1 and 3. In the form illustrated, page 5 carries exercises for instructing the learner in the identification of state capitals. The questions, consisting of the names of states, adjacent to the lower margin of apertures 21 on page 3, cooperate with the answers printed adjacent the upper edges of the apertures 22 on page 5. When looking at page 3, the learner will have before him the name of a particular state and the name of the capital of that state, which appears through the aperture 21 because of the overlaping relationship thereof with respect to aperture 22. Thus, he can study the names of the state capitals. When it is desired to test his ability, the learner inserts a separate worksheet beneath page 3, which obscures the names of the capital cities on page 5, and proceeds to write his responses on the worksheet through the apertures 21. For checking, the worksheet is inserted beneath leaf 17 and when this is done the correct response is visible together with the learner's response. At the same time the question is visible, which, in this case, is the particular state the capital of which is to be identified. In other words, the relationship between pages 3 and 5 is exactly the same as the relationship between pages 1 and 3. Only the subject matter differs.

As indicated, the unapertured leaf 18 may have openings 23 through the upper portion thereof, but it must be unapertured in the area lying beneath the apertures 20, 21 and 22 in the leaves thereabove. The unapertured portion of the leaf 16 may contain questions which cooperate with another set of leaves therebeneath (not shown).

To utilize each page economically, the opposite sides of leaves 15, 16 and 17, which serve as pages 2, 4 and 6, respectively, may carry subject matter similar in nature to pages 1, 3 and 5. Except for the details of the subject matter, page 1 will correspond exactly to page 6; page 3 will correspond exactly to page 4; and page 5 will correspond exactly to page 2. Pages 2, 4 and 6 are not shown in the drawing.

The top portions of pages 3 and 5 may be used for explanatory material. If page 7 is not used for introducing new questions and is free of apertures, it too may be used for explanatory material.

Although the invention has been illustrated in one particular form, it will be apparent to those skilled in the art that variations of the invention can be made without departing from the true spirit of the invention. It is our intention not to limit the invention other than as necessitated by the scope of the appended claim.

What we claim as new and desire to secure by Letters Patent of the United States is:

An educational workbook containing a set of three apertured leaves comprising six pages and a fourth unapertured leaf for bridging the apertures in adjacent sets to provide a smooth supporting writing surface for an insertable worksheet, each of said three leaves having a set of cooperating apertures which overlap with respect to apertures in adjacent leaves so that an opening extends through all three leaves with a marginal area adjacent each aperture in any leaf being visible through the cooperating aperture in the leaf above, the first page containing questions to be answered by writing through the apertures on a separate worksheet insertable beneath said first page, the third page containing the correct answers to said questions on said exposed marginal areas adjacent the appropriate aperture, said third page also containing questions to be answered by writing through apertures therein, the fifth page containing correct answers to said questions on said exposed marginal areas adjacent the appropriate aperture on said third page.

References Cited in the file of this patent

UNITED STATES PATENTS

| | | |
|---|---|---|
| 1,157,599 | Studebaker | Oct. 19, 1915 |
| 1,781,047 | Bondeson | Nov. 11, 1930 |
| 2,213,225 | Maggioni | Sept. 3, 1940 |
| 2,503,130 | Poritz | Apr. 4, 1950 |